United States Patent [19]

Beaver

[11] Patent Number: 4,635,370
[45] Date of Patent: Jan. 13, 1987

[54] CALIPER

[76] Inventor: Bud K. Beaver, Coronado, Calif.

[21] Appl. No.: 672,710

[22] Filed: Nov. 19, 1984

[51] Int. Cl.[4] .............................................. G01B 3/16
[52] U.S. Cl. .................................... 33/149 R; 33/151; 33/495
[58] Field of Search ................. 33/149 R, 149 B, 150, 33/151, 152 R, 153 R, 153 E, 148 R, 148 E, 27 R, 27 B, 495; 403/61, 116, 119; 16/340, 342, 358, 359, 361

[56] References Cited

U.S. PATENT DOCUMENTS

| 267,481 | 11/1882 | Bellamy | 33/149 R |
| 297,492 | 4/1884 | Bovensiep | 33/153 R |
| 709,738 | 9/1902 | Brandell | 33/151 |
| 2,582,585 | 1/1952 | De Cesaris | 33/27 B |
| 3,114,977 | 12/1963 | Modin | 33/149 R |
| 4,388,759 | 6/1983 | Orejola | 33/148 E |

FOREIGN PATENT DOCUMENTS 35715 10/1913 Sweden .............................. 33/149 R Primary Examiner—Charles Frankfort
Assistant Examiner—Patrick R. Scanlon
Attorney, Agent, or Firm—Thomas J. Tighe

[57] ABSTRACT

A caliper for the direct reading of the size of nuts, boltheads and fittings. On each leg of the caliper is a linear scale, one scale being calibrated in metric units, and the other in English units. When the terminal tips of the caliper are brought into contact with parallel faces of a fitting, the size of the fitting is read on either scale at the point where the inner edges of the legs intersect. All points on the legs of the caliper translate along concentric arcs of circles which have a common virtual pivot point in space, remote from the upper end of the caliper.

13 Claims, 10 Drawing Figures

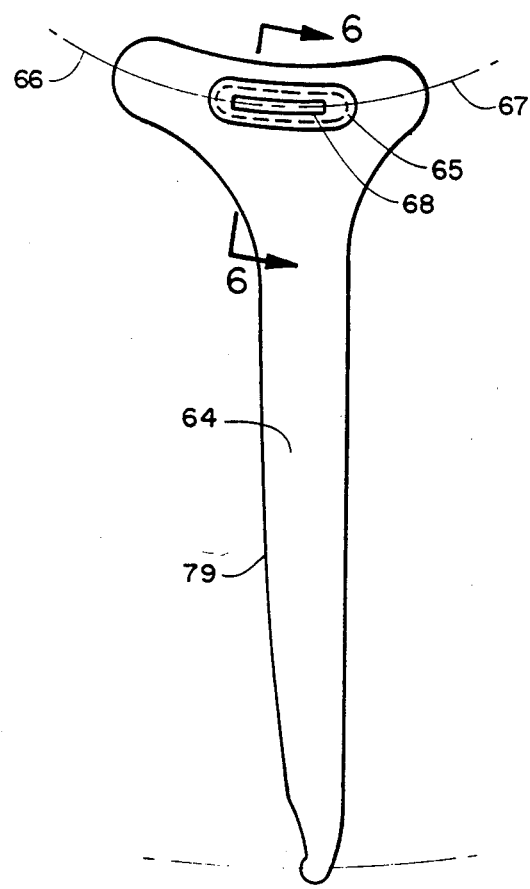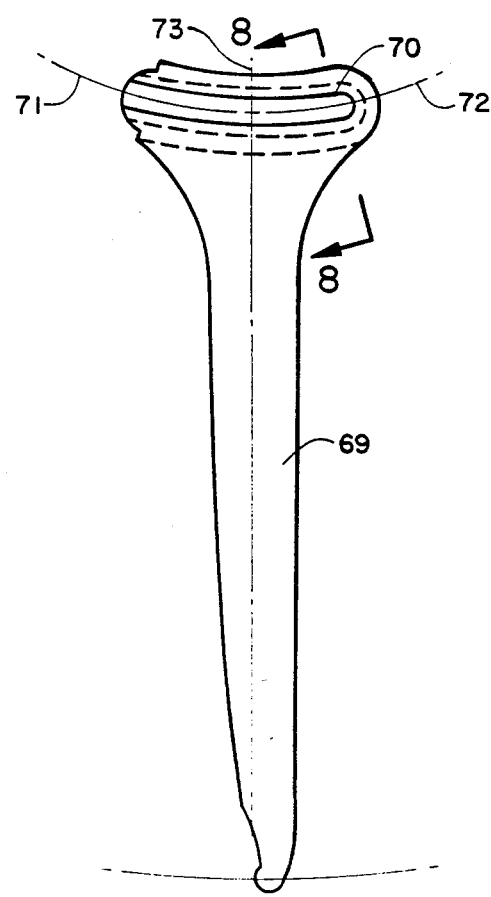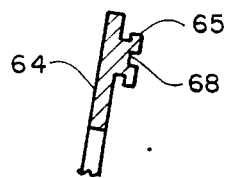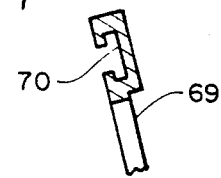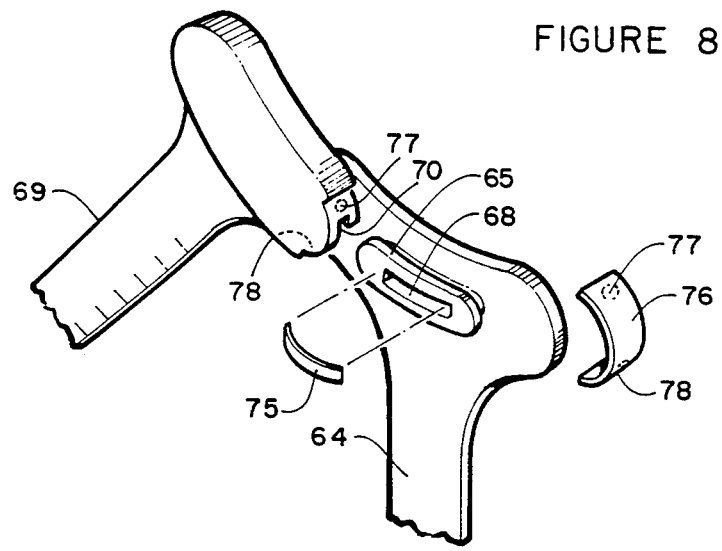
FIGURE 5
FIGURE 7
FIGURE 6
FIGURE 8
FIGURE 9

CALIPER

BACKGROUND OF THE INVENTION

The present invention relates to calipers and, more particularly, to calipers for measuring the size of nuts, bolt heads, couplings and similar fittings.

When selecting a wrench of socket tool for applying torque to a nut, bolt head or similar fitting, it is common practice for the operator to sight the fitting and guess at its size. In many cases, the operator finds that the tool which he selected is mismatched to the fitting size and that he must guess again.

The present invention is for a caliper which rapidly and accurately measures the size of a fitting, thereby enabling the operator to select the correct wrench or socket size on the first try.

SUMMARY OF THE INVENTION

Briefly described, the caliper comprises two blade-shaped legs. At one end the legs are coupled together slidably by means which cause all points on the legs to rotate on arcs of concentric circles whose common center is located in space. At their opposite ends, the legs have terminal tips which span the distance across parallel sides of a nut, bolt head or similar fitting. A linear metric scale is inscribed along the inner edge of one leg and a linear English scale is inscribed along the inner edge of the other leg, but on the back face thereof. When the terminal tips of the legs span the distance across parallel sides of a fitting, the size of the fitting, in either metric or English units, is read on the appropriate scale at the point where the inner edges of the legs intersect.

An object of this invention is to provide a caliper with scale ranges comparable to conventional calipers but with much shorter legs.

A further object of this invention is to provide a caliper with constant spacing between scale increments, heretofore unavailable in conventional calipers.

A further object of the present invention is to provide a caliper of convenient breast pocket size, having scale ranges comparable to conventional calipers which are too large to be conveniently carried in the breast pocket.

DESCRIPTION OF THE DRAWINGS

FIGS. 5, 6, 7, 8 and 9 show alternate means for slidably coupling the legs together, in which:

FIG. 5 is a front elevation of the inside face of one leg.

FIG. 6 is a section view of the upper end of the leg shown in FIG. 5.

FIG. 7 is a front elevation of the inside face of the other leg.

FIG. 8 is a section view of the upper end of the leg shown in FIG. 7.

FIG. 9 is an exploded perspective view of the components which comprise the caliper in this alternate embodiment.

DESCRIPTION OF THE PREFERRED EMBODIMENTS

Figure 1:
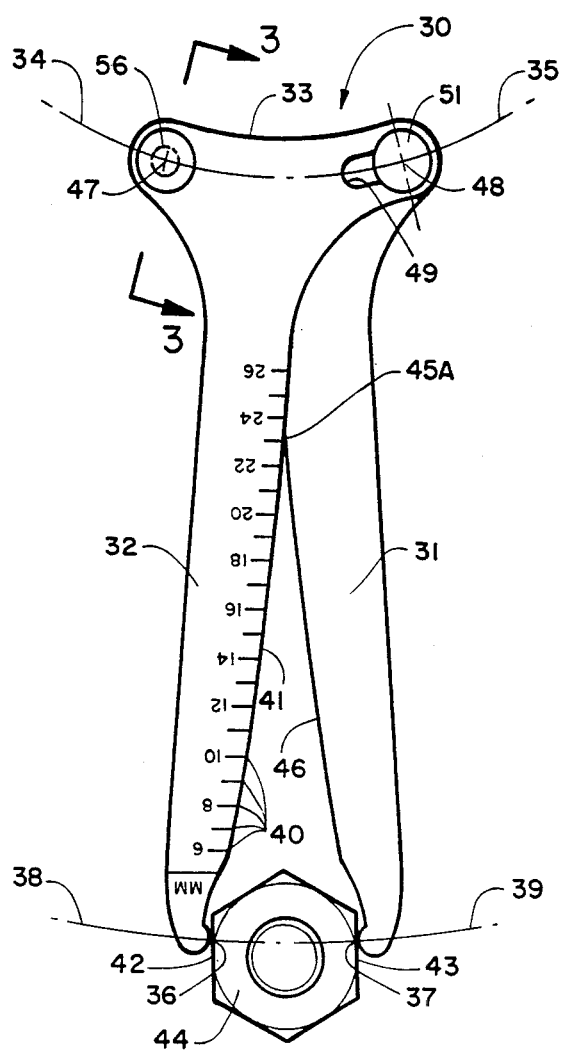
FIG. 1 is a front elevation of one side of the caliper.

FIG. 1 is a front elevation of one side of the caliper generally designated 30 which has two blade-shaped legs 31 and 32, leg 32 being positioned atop leg 31. At their upper ends the legs are coupled together slidably by means which permit planar, opposal rotation of each leg about a virtual pivot point (not shown). The virtual pivot point is located in the same plane as the legs, but at a point in space remote from the upper end 33 of the caliper.

When the legs 31 and 32 are physically moved together or apart by the operator, all points on the caliper translate along arcs of concentric circles whose center is located at the virtual pivot point. For example, the upper ends of the legs translate along arc 34-35 and the terminal tips 36 and 37 of the legs translate along arc 38-39.

A calibrated metric scale 40 is inscribed along the inner edge 41 of the leg 32.

When the terminal tips 36 and 37 of the legs are brought into physical contact with parallel faces 42 and 43 of a nut 44 or similar fitting, the size of the fitting is read on the scale at a point 45A where the inner edges 41 and 46 of the legs intersect. For the caliper position shown in FIG. 1, this point of intersection is at a scale reading of 23 millimeters. The operator would, therefore, select a wrench or socket size of 23 millimeters to apply torque to the nut 44.

The advantage of having the legs translate along an arc defined by a virtual pivot point over having the legs rotate about an actual pivot point, where the legs are pinned together as in conventional calipers, is that the legs can be much shorter in the virtual pivot point caliper.

This is due to the fact that, in both types of calipers, when the terminal tips of the legs are moved transversally by an incremental amount, all points on the legs move transversally by progressively lesser amounts as viewed from their terminal tips toward the pivot point. At the pivot point is conventional calipers the transverse movement between the legs is zero. Because the movement of the legs is so small near the pivot point, it becomes difficult to differentiate between adjacent scale readings. This problem can be avoided by locating the scales at a considerable distance down the legs from the pivot point. However, in the case of the actual pivot point caliper, this results in a caliper which is much longer than necessary. In the virtual pivot point caliper the actual (physical) pivot point and a significant part of the legs are essentially cut off, resulting in a caliper which is much shorter in length.

In this preferred embodiment, the upper ends of the legs are coupled together slidably by means of two rivets 51 which have their centers at 47 and 48. Each rivet slides within, and is guided by, an arcuate slot 49.

Figure 2:
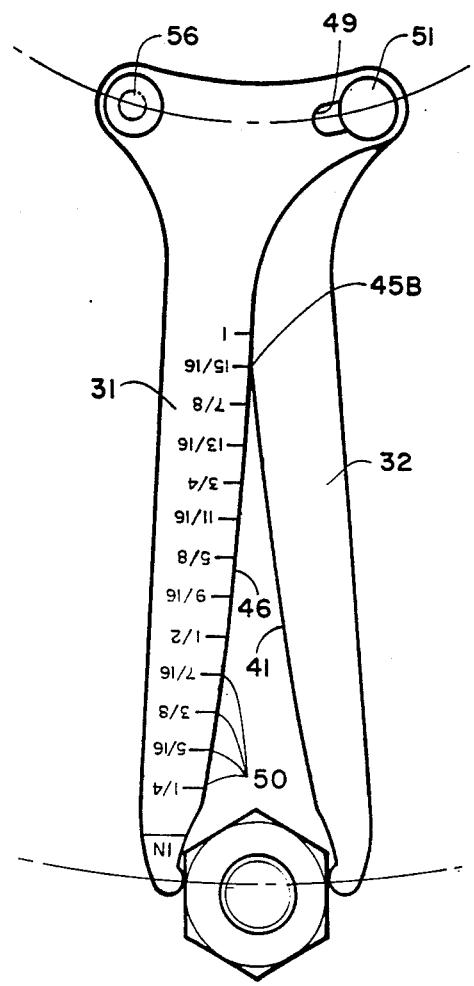
FIG. 2 is a front elevation of the opposite side of the caliper.

FIG. 2 is a front elevation of the other side of the caliper which shows a linear English scale 50 inscribed along the inner edge 46 of leg 31. As described previously, the size of the fitting is read on the scale at a point 45B where the inner edges 41 and 46 of the legs intersect. For the caliper position shown in FIG. 2, this point of intersection 45B shows the size of the fitting to be 15/16 inches.

Although the inner edges 41 and 46 of the legs 32 and 31, respectively, may be defined by straight lines, the preferred embodiment is to have the inner edges defined by slightly convex curves. This curvature is required to obtain equal spacing between the indicia on each of the scales. The equal spacing is possible because the curvature of the inner edges are adapted to make variations of the point of inner edges intersection along a scale directly proportional to corresponding variations in terminal tip gap.

Since the caliper can be read on either an English or on a metric scale, the calibrations of the two scales are mutually dependent functions. That is, if one first establishes the vertical spacing between the indicia of either of the two scales, the vertical spacing between the indicia of the other scale becomes fixed automatically. The same interdependence between the scales applies to their respective locations on the caliper legs.

Figure 3:
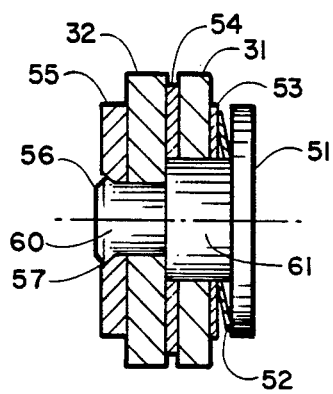
FIG. 3 is a double scale section through the axis of one of the rivets which couple the legs together.

FIG. 3 is a double scale section through the axis of one of the rivets shown in FIG. 1 in which:

51 is a rivet
52 is a steel wave washer
53 is a flat washer
31 is one leg of the caliper
54 is a flat washer
32 is the other leg of the caliper
55 is a flat washer, having a countersink 57
56 is the shank end of the rivet The rivet shank is comprised to two portions: a portion of unreduced diameter (large portion) 61, and a portion of reduced diameter (small portion) 60.

When the components are assembled as shown, they are held together by upsetting the shank end 56 of the rivet into the countersink 57 of the washer 55. The steel wave washer creates a force between the assembled components to ensure that the legs are frictionally held in a fixed relative position until they are intentionally moved by the operator.

Figure 4:
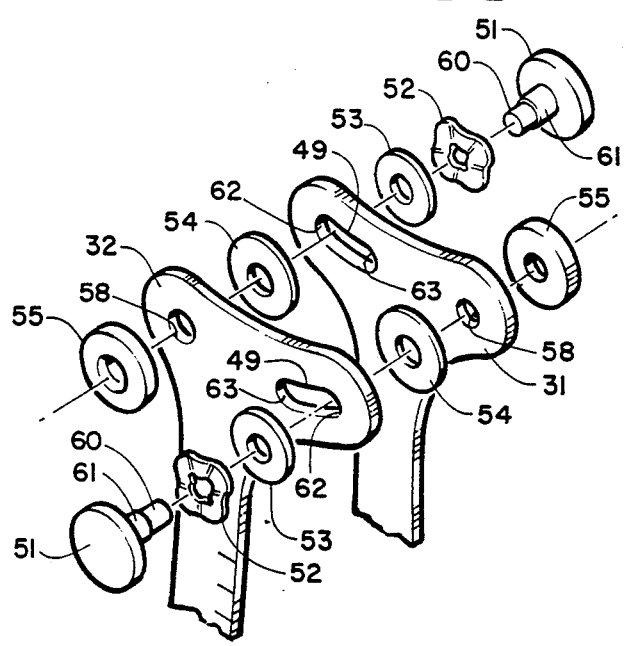
FIG. 4 is an exploded perspective view of the components which comprise the caliper.

FIG. 4 is a exploded perspective view of all of the components which comprise the caliper in which:

51 are the rivets
52 are the steel wave washers
53 are flat washers
31 is one leg of the caliper
54 are flat washers
32 is the other leg of the caliper
55 are flat washers which have countersinks (omitted in this figure for clarity).

The legs 31 and 32 each define a hole 58 and a slot 49. The center of each hole and centerline of each slot are located on the arc of a circle. This arc is shown as 34-35 in FIG. 1. The small portions 60 of the rivet shanks fit snugly through the holes 58 of the legs and through the washers 55. Upsetting the shank end 56 of the rivet, as shown in FIG. 3, causes the diameter of the small portion 60 of the rivet shank to expand against the confines of the hole 58 thereby affixing the rivet shank to the leg 32. The large portions 61 of the rivet shanks are adapted to slide within the slots 49 and be guided by same.

When the legs of the caliper are in the fully open position, the large portions 61 of the rivet shanks abut the outside ends 62 of the slots 49. When the legs are in the fully closed position, the larger portions 61 of the rivet shanks abut the inside ends 63 of the slots.

An alternate method for coupling the legs together slidably comprise tongue and groove means as shown in FIGS. 5, 6, 7, 8 and 9.

FIG. 5 is a front elevation of the inside surface of one leg 64. Integral with and projecting above the surface of the leg is a tongue 65. The centerline of the tongue coincides with the arc 66-67 of a circle whose center (not shown) is located in space at the same point as in the preferred embodiment. An arcuate cavity 68 is defined by and located at the end of the tongue remote from the surface 64. The inner edge 79 of the leg 64 is defined by a convex curve, as in the preferred embodiment.

FIG. 6 is a section view of FIG. 5 through the tongue in which the tongue 65 is shown projecting from the leg 64, and also showing the arcuate cavity 68.

FIG. 7 is a front elevation of the inside surface of the other leg 69. At the upper end of the leg is an arcuate groove 70. The centerline of the groove coincides with the arc 71-72 which has the same curvature as the arc 66-67, shown in FIG. 5. A longitudinal axis 73-74 of this leg is shown for future reference.

FIG. 8 is a section view of the leg shown in FIG. 7, in which 69 is the leg and 70 is the groove.

FIG. 9 is a perspective view of the components which comprise the caliper in this embodiment. To assemble the caliper, leg 64 is maintained in the same orientation shown in FIG. 5. Leg 69 is first rotated 180 degrees about its longitudinal axis 73-74, identified in FIG. 7. An arcuate leaf spring 75, adapted to cause friction between the tongue 65 and the groove 70, is inserted and held depressed in the arcuate cavity 68. The tongue 65 is then moved slidably into the groove 70.

When the legs are assembled, as described above, an end plate 76 is spot welded onto leg 69 at points 77 and 78.

Both the preferred embodiment and the alternate embodiment may be manufactured from either steel or plastic. If plastic is used for the alternate embodiment, the end plate 76 would be cemented onto leg 69.

As stated previously, to achieve equal spacing between the scale indicia, the inner edges of the caliper legs must be convex curves. This is shown with the aid of FIG. 10 in which:

y is one leg of the caliper. Since the other leg is identical in geometry, it is omitted for clarity.

P is the virtual pivot point. It is the center of rotation for all arcs shown in the diagram.

P-e is the centerline between the two legs (the second leg is not shown).

a-b, b-c, c-d and d-e are equal arcs. Therefore, A, B, C, and D are equal angles.

f is the point on the inner edge of the leg which locates the scale indicium for the fully open position of the caliper. It may be located somewhat arbitrarily on the line P-e.

f-g, g-h, h-i and i-j are equal in length. They represent equal spacing intervals between the scale indicia.

Figure 10:
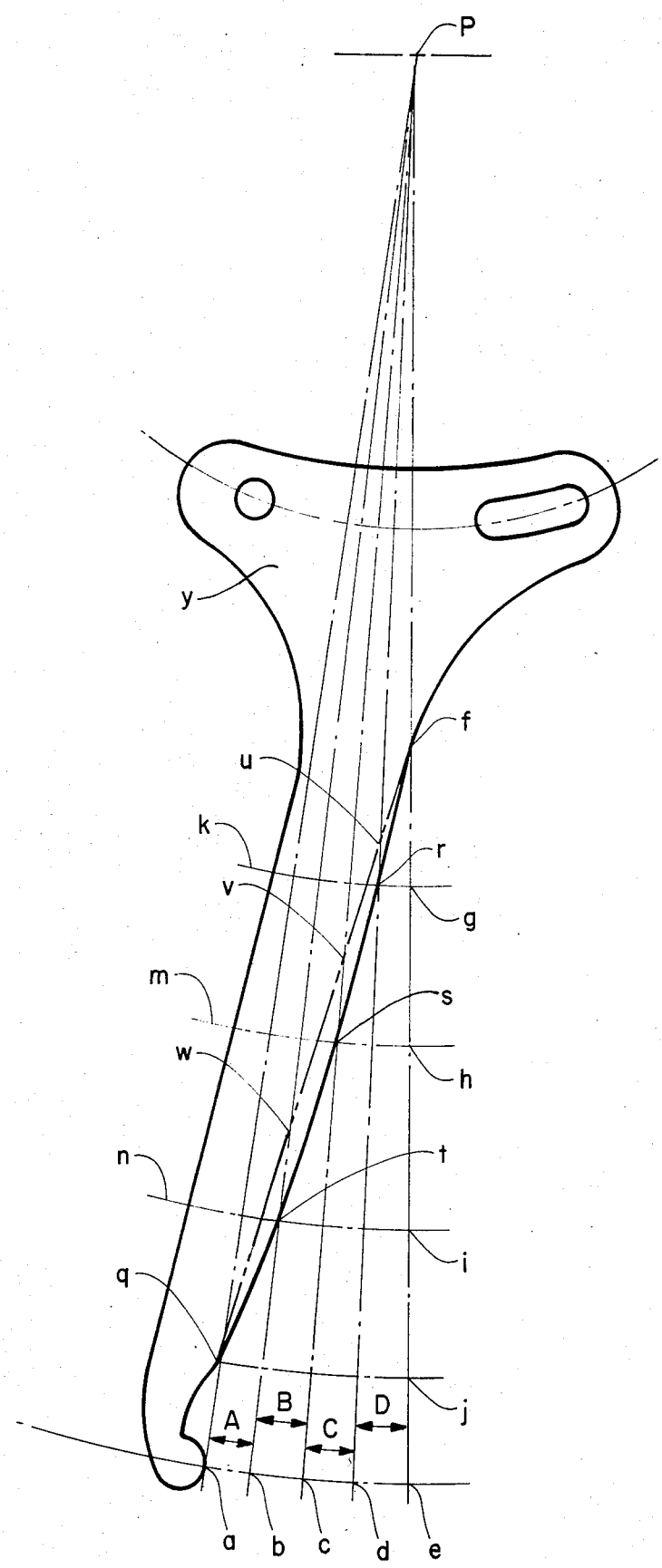
FIG. 10 is a geometric sketch which shows the relationship between the scale spacing and the curvature on the inner edge of the caliper legs.

Assume that the caliper leg as shown in FIG. 10 is in the fully open position. If the leg is now closed by 25% of its fully open position, the following changes occur:

The terminal tip of leg y moves from point a to point b.

The radial line P-a moves to coincide with line P-b.

The radial line P-d moves to coincide with the radial line P-e.

When one leg of the caliper is in the fully open position as shown in FIG. 10, the scale indicium point which matches the 25% closed position must be located somewhere on the radial line P-d. But, to have equal spacing between scale indica, this same point must also be located somewhere on the arc g-k. These two conditions are met where the line P-d and the arc g-k intersect; namely, at point r.

If the caliper is now closed by 25% of its fully open position, point r will coincide with point g. This would be the point of intersection of the inner edges of the caliper legs. In other words, if the fully open position of the caliper between the terminal tips of both legs (the second leg is not shown) were 1", the scale indicium reading at point r would be ¾".

By repeating the procedure outlined above, the scale indicia points for 50%, 75% and 100% closed positions of the caliper can be located at s, t, and q respectively. A faired line drawn between points f, r, s, t and q is a convex curve which defines the shape of the inner edges of both legs of the caliper.

Conversely, if the inner edge of the caliper leg were defined by a straight line, the line would have to pass through point f to locate the scale indicium point for the fully open position and through point q to locate the scale index point for the fully closed position. The scale indicia for the 25%, 50% and 75% closure positions would then have to be located where this straight line inner edge of the caliper intersects the radial lines P-d, P-c and P-b respectively. These points of intersection occur at u, v and w. The spacing between these scale indicia varies significantly, and can be seen to be unequal.

Although the embodiments described show an outside caliper, the novel features of this invention are equally applicable to inside calipers.

The foregoing description was for illustrative purposes only, and unnecessary limitations on the claims hereinafter should not be drawn therefrom.

I claim:

1. A caliper comprising two legs, and a coupling means adapted to slidably couple the legs together and adapted to permit coplanar, opposing rotation of the legs about a single fixed virtual pivot point such that all points on the legs, when rotated, translate along arcs of concentric circles whose common center is at the single fixed virtual pivot point.

2. The caliper of claim 1 wherein the coupling means comprises:
   (a) an arcuate slot defined by a coupling end of a first leg,
   (b) an arcuate slot defined by a coupling end of a second leg, the centerlines of the arcs of the two slots lying on concentric circles whose common center is at the virtual pivot point,
   (c) a shank means affixed to the first leg coupling end and slidably disposed in the second leg arcuate slot, said first leg shank means being adapted to be confined within and guided by said second leg slot,
   (d) a shank means affixed to the second leg coupling end and slidably disposed in the first leg arcuate slot, said second leg shank means being adapted to be confined within and guided by said first leg slot, and
   (e) means to frictionally hold the legs in their relative positions when they are not being moved by an operator.

3. The caliper of claim 1 wherein the couplings means comprises:
   (a) an arcuate groove defined by a coupling end of a first leg, the arc of the groove lying on a circle whose center is at the virtual pivot point,
   (b) an elongated arcuate tongue means affixed to a coupling end of a second leg and slidably disposed in the first leg groove, the tongue means being adapted to be guided by said groove, and
   (c) means to frictionally hold the legs in their relative positions until they are moved by an operator.

4. The caliper of claim 2 wherein each shank means comprises a rivet means with a shank, and further comprising:
   (a) a shank hole defined by the first leg and aligned with the arcuate slot of the second leg, the shank of a first rivet means being snugly disposed in the first leg shank hole but slidably disposed in the second leg arcuate slot, and
   (b) a shank hole defined by the second leg and aligned with the arcuate slot of the first leg, the shank of a second rivet means being snugly disposed in the second leg shank hole but slidably disposed in the first leg arcuate slot.

5. The caliper of claim 4 wherein the frictional holding means comprises a pair of wave washers disposed, one each, circumferentially on the shanks of the rivet means and adapted to cause friction between the coupling ends of the legs.

6. The caliper of claim 3 wherein the frictional holding means comprises:
   (a) a cavity defined by an end of the tongue means which faces the groove, and
   (b) a leaf spring disposed in the cavity and adapted to cause friction between the tongue and the groove.

7. The caliper of claim 1, 2, 3, 4, or 5 wherein each leg as an inner edge and a terminal tip, and at least one leg has a first scale thereon, the scale comprising a plurality of spaced apart indicia adapted to be read at points of intersection of the inner edges of the legs, each indicium corresponding to a unique gap between the terminal tips.

8. The caliper of claim 7 wherein the inner edges of the legs are curved convexly, the curves of the inner edges being adapted to make variations of the point of inner edges' intersection along the scale directly proportional to corresponding variations in terminal tip gap.

9. The caliper of claim 7 further comprising a second scale on a second leg, the second scale being on a side of the caliper opposite the first scale.

10. The caliper of claim 8 further comprising a second scale on a second leg, the second scale being on a side of the caliper opposite the first scale.

11. A caliper comprising:
    (a) two legs, each having a convexly curved inner edge and a terminal tip at one end,
    (b) a coupling means at an end remote from the terminal tips, the coupling means being adapted to slidably couple the legs together and being further adapted to permit planar, opposing rotation of the legs about a single fixed virtual pivot point,
    (c) a first scale on at least one leg comprising a plurality of spaced apart indicia adapted to be read at points of intersection of the inner edges of the legs, the curves of the inner edges being adapted to make variations of the point of inner edges' intersection along the scale directly proportional to corresponding variations in terminal tip gap.

12. The caliper of claim 11 further comprising a second scale on a second leg, the second scale being on a side of the caliper opposite the first scale.

13. The caliper of claim 12 wherein the first scale is calibrated in the English system of measures, and the second scale is calibrated in the metric system of measures.

* * * * *